US007073376B2

(12) United States Patent
Hassdenteufel et al.

(10) Patent No.: US 7,073,376 B2
(45) Date of Patent: Jul. 11, 2006

(54) METHOD FOR TESTING THE FUNCTIONALITY OF A TANK VENTING SYSTEM OF A MOTOR VEHICLE HAVING AN INTERNAL COMBUSTION ENGINE

(75) Inventors: Armin Hassdenteufel, Sachsenheim-Ochsenbach (DE); Karl-Bernhard Lederle, Renningen (DE); Michael Pfeil, Schwieberdingen (DE); Andreas Mueller, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/039,229

(22) Filed: Jan. 18, 2005

(65) Prior Publication Data

US 2005/0178192 A1 Aug. 18, 2005

(30) Foreign Application Priority Data

Feb. 17, 2004 (DE) ...................... 10 2004 007 520

(51) Int. Cl.
*G01M 19/00* (2006.01)

(52) U.S. Cl. ........................ 73/118.1; 73/116; 73/117.2; 73/117.3

(58) Field of Classification Search ................ 73/118.1
See application file for complete search history.

(56) References Cited

U.S. PATENT DOCUMENTS 6,820,467 B1 * 11/2004 Streib ......................... 73/49.2
6,845,652 B1 * 1/2005 Stegmann et al. ........... 73/49.2
6,889,667 B1 * 5/2005 Fritz et al. .................. 123/520
2005/0034513 A1 * 2/2005 Streib et al. ............... 73/118.1

FOREIGN PATENT DOCUMENTS

DE 101 36 183 2/2003

* cited by examiner

*Primary Examiner*—Edward Lefkowitz
*Assistant Examiner*—Freddie Kirkland, III
(74) *Attorney, Agent, or Firm*—Kenyon & Kenyon LLP

(57) ABSTRACT

A method for testing the functionality of a tank system of a motor vehicle having an internal combustion engine, including a controllable tank venting valve connected to an intake manifold and at least one pressure source for testing the tightness of the tank venting system using overpressure or underpressure, the functionality of the tank venting valve being tested via its activation in an opening and/or closing manner during pressurizing the tank system using overpressure or underpressure and by registering and evaluating at least one operating variable of the pressure source. The tank system is pressurized with overpressure or underpressure and the at least one operating variable of the pressure source is registered and evaluated during operation of the engine.

5 Claims, 2 Drawing Sheets

(State of the Art)

METHOD FOR TESTING THE FUNCTIONALITY OF A TANK VENTING SYSTEM OF A MOTOR VEHICLE HAVING AN INTERNAL COMBUSTION ENGINE

BACKGROUND INFORMATION

German Patent Application No. DE 101 36 183, for example, describes a method for testing the functionality of a tank venting valve located in a fuel tank system of a motor vehicle in particular.

In this method, a defective tank venting valve is diagnosed by analyzing at least one operating variable, e.g., the pump current of at least one pressure source, a pump for example.

In this method, the tank venting valve is initially closed while the activated carbon filter shut-off valve is closed and the pump is subsequently operated for building up a preferable overpressure in the tank. The overpressure build-up is measurable based on the pump's operating variable. The pressure rapidly drops again during subsequent opening of the tank venting valve. This may also be detected based on the operating variable.

On the basis of the operating variable, it is assumed that the tank venting valve is intact or defective.

On the basis of this method, testing of the tank venting valve's functionality may be effectively carried out. However, a defective connection between the tank venting valve and the intake manifold of the engine is not able to be detected.

Due to statutory provisions in many countries, it is now required to test not only the functionality of the tank venting valve but also the functionality of the connection between the tank venting valve and the intake manifold of the engine. In other words, it must be ensured that a purge flow exists via the tank venting valve to the engine.

It is therefore an object of the present invention to provide a method for testing the functionality of a tank venting system of a motor vehicle having an internal combustion engine in such a way that both the functionality of the tank venting valve and the functionality of the purge process may be tested.

SUMMARY OF THE INVENTION

The present invention is based on the idea of executing the method for testing the functionality of the tank venting system during operation of the engine and, based on the operating variable of the pressure source via which overpressure or underpressure is generated in the tank system, conclusions may be drawn not only with regard to the functionality of the tank venting valve but also with regard to the functionality of the connection of the tank venting valve to the intake manifold of the engine.

In an advantageous embodiment of the method, the operating variable of the pressure source is initially registered and stored as a comparison value, ambient pressure prevailing in the tank when the pressure source is initially activated. In this state, the pressure source, a pump for example, must perform a no-load operation while the tank venting valve is closed, which results in the value of the operating variable adjusting itself to a certain level. Overpressure or also underpressure is introduced in the tank system, the tank venting valve is opened, and the operating variable of the pressure source is registered during opening of the tank venting valve. Based on a comparison of the registered operating variable with the comparison value, conclusions are drawn with regard to the functionality of the tank venting valve and the functionality of the connection between the tank venting valve and the intake manifold.

If, after opening of the tank venting valve, the pressure in the tank system reassumes the ambient value, i.e., if the operating variable assumes the comparison value, the conclusion may be drawn that the tank venting valve is intact, but the connection to the engine was not established.

A functioning tank venting valve and a functioning connection between the tank venting valve and the intake manifold are assumed when the registered operating variable is smaller than the comparison value by a predefinable value. The drop below the comparison value with the lines intact is caused by the underpressure prevailing in the intake manifold which, with the tank venting valve open, generates underpressure in the tank system. Such a underpressure may be detected based on the operating variable of the pressure source, and, in the event that underpressure instead of overpressure is initially introduced in the tank system, this underpressure is less in terms of the absolute value than the underpressure caused by the opening of the tank venting valve.

A functioning tank venting valve, but a non-functioning connection between the tank venting valve and the intake manifold is assumed when the registered operating variable essentially corresponds to the comparison value, because the engine does not generate underpressure in the tank system in this case, so that an intact connection is not able to exist between the intake manifold of the engine and the tank system.

If, in contrast, the operating variable of the pressure source does not change after the tank venting valve is opened, i.e., the generated underpressure or overpressure does not drop, the tank venting valve is assumed to be jammed closed.

Conversely, a jammed open tank venting valve is assumed when, after the activation of the tank venting valve in a closing manner, the operating variable of the pressure source changes rapidly in the direction of the value corresponding to the underpressure which builds up via the intake manifold pressure in the tank system when the tank venting valve is jammed open.

DETAILED DESCRIPTION

Figure 1:
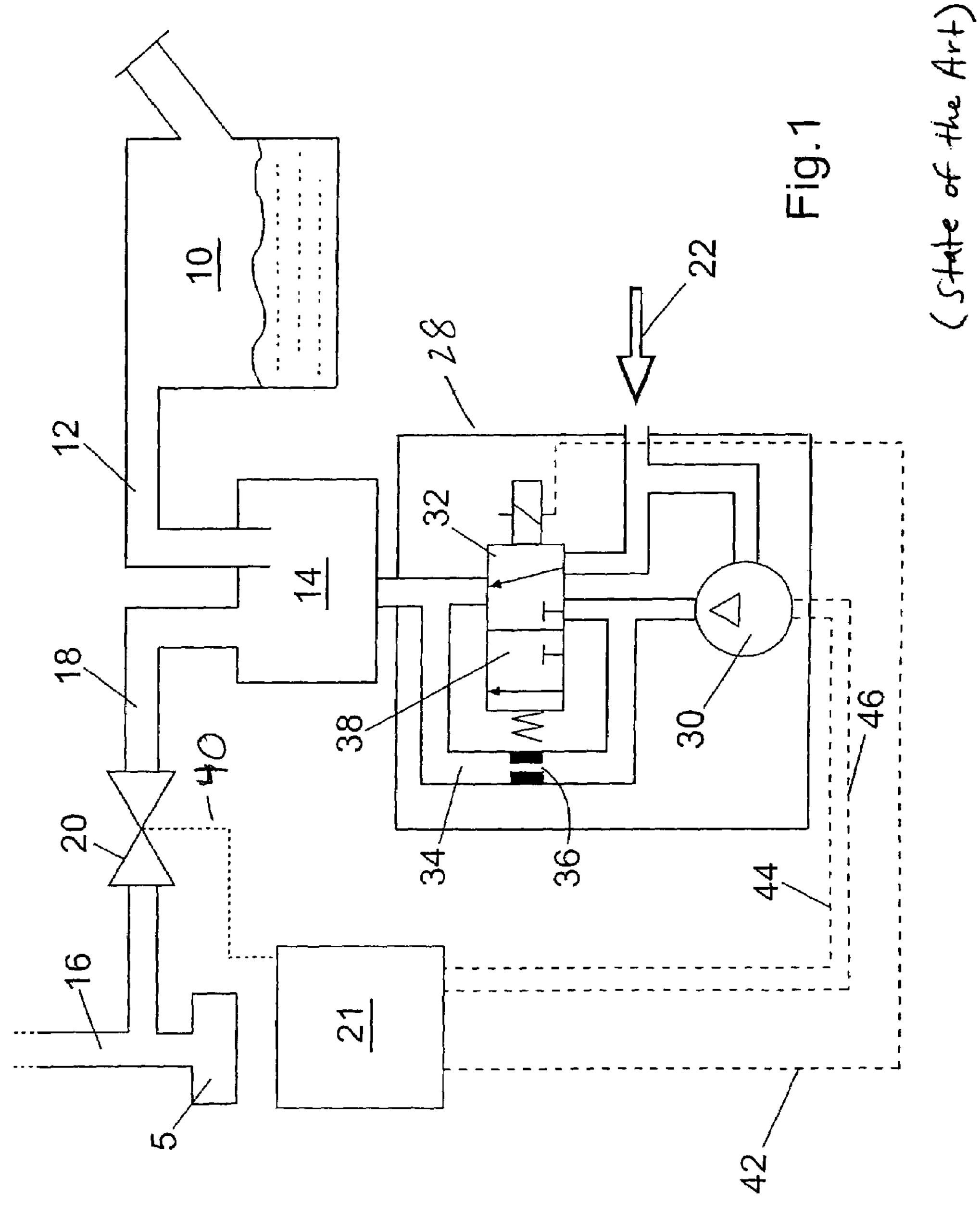
FIG. 1 shows a tank system of a motor vehicle in which a method utilizing the present invention is used.

The tank system of a motor vehicle having an internal combustion engine 5, illustrated in FIG. 1 in the form of a block diagram, includes a tank 10 which is connected to an activated carbon filter 14 via a tank connecting line 12. An intake manifold 16 of internal combustion engine 5 is also connected to tank 10 via activated carbon filter 14, via an intake line 18, and via a tank venting valve (TVV) 20 located in the intake line.

Volatile hydrocarbon vapors form in tank 10 which reach activated carbon filter 14 via line 12 and are reversibly bound there in a known manner.

In the case of a TVV 20 activated in an opening manner by a control unit 21 via a first electrical control line 40, and a switching valve 32 correspondingly activated via a second control line 42, fresh air 22 from the surroundings is sucked in through activated carbon filter 14, fuel, possibly stored therein, being released into the sucked-in air and activated carbon filter 14 consequently regenerating itself.

A leak diagnostic unit 28 connected to activated carbon filter 14 is provided to diagnose the tightness of tank 10 or of the entire tank system. Diagnostic unit 28 includes a pressure source, preferably a vane pump 30. The above-mentioned switching valve 32 is located upstream from pump 30. A reference leak 36 is positioned in a separate line branch 34. In the example, reference leak 36 is opened and closed using a magnetic sliding valve 38. The particular dimension of reference leak 36 is selected in such a way that it corresponds to the size of the leak to be detected. The reference leak has an opening cross section of 0.5 $mm^2$.

Switching valve 32 has two switching positions. In the first position, pump 30 is connected in a pressure-conducting manner to tank 10 via activated carbon filter 14 and pumps ambient air into tank 10. The power consumption of pump 30 is continuously registered while the fresh air is pumped into tank 10. For performing a reference measurement, switching valve 32 is completely closed so that, by using magnetic sliding valve 38, the power consumption of pump 30 may be registered based on the dynamic pressure building up upstream from reference leak 36. Control of pump 30 via control unit 21 and the release of the power consumption data takes place via corresponding control and data lines 44, 46.

Figure 2:
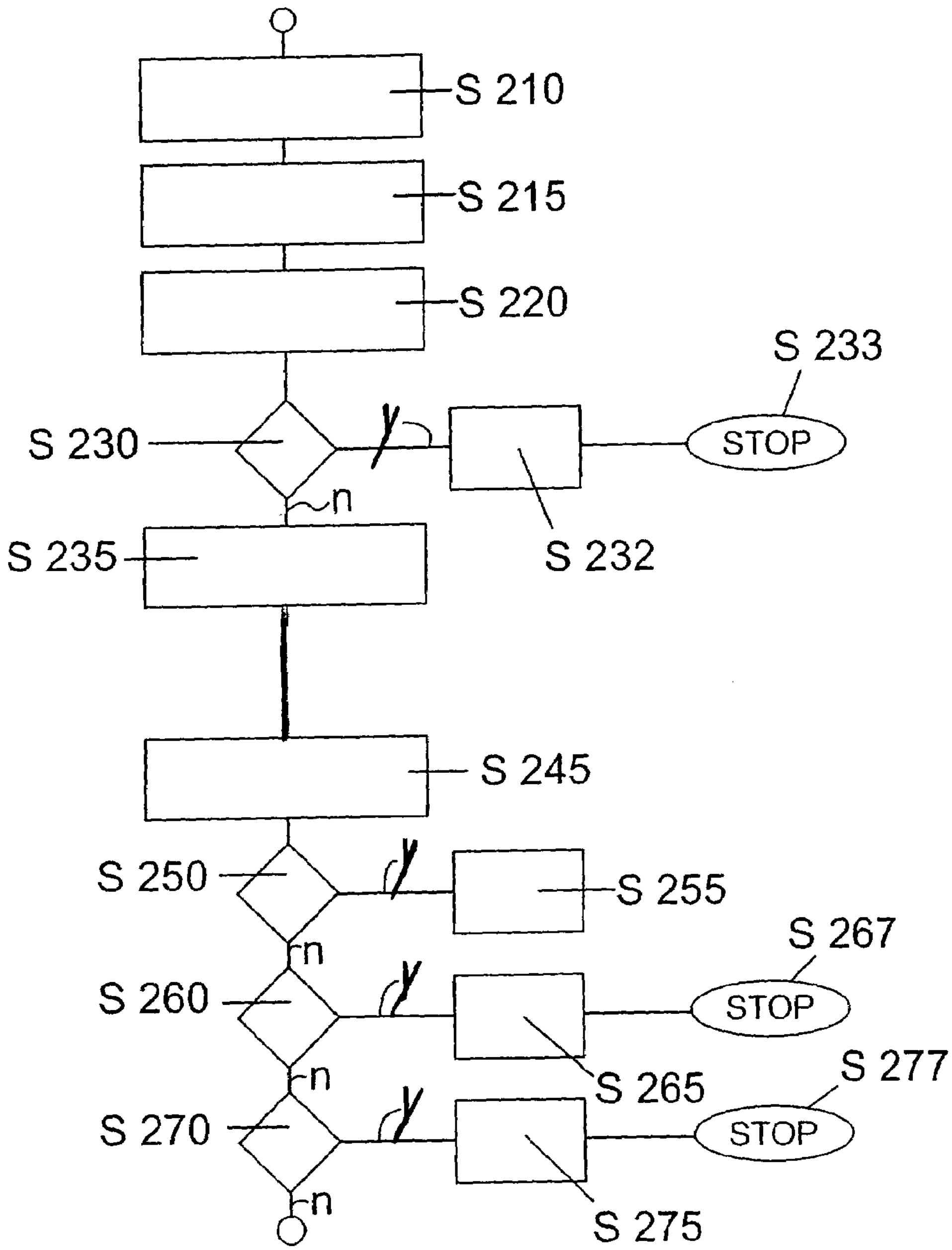
FIG. 2 shows a flow chart of a method according to the present invention.

For testing the functionality of TVV 20 and in particular for testing the functionality of intake line 18, which connects TVV 20 to intake manifold 16 of internal combustion engine 5, overpressure is generated in the tank system using pump 30 and the power consumption of pump 30 is registered while the overpressure is generated. As is the basic idea of the present invention, the overpressure is generated and the power consumption is registered during the operation of internal combustion engine 5. Such a method is described in greater detail in the following in connection with FIG. 2.

At the start of the overpressure build-up in the tank system, pump 30 performs a no-load operation (step S 210) while TVV 20 is closed. The registered value of the operating variable is stored as the comparison value in step S 215. Overpressure is subsequently introduced in the tank system in step S 220.

It is initially checked in step S 230 whether the operating variable, i.e., the power consumption of pump 30, changes rapidly in the direction of the value which corresponds to the intake manifold pressure. If this is the case, it is assumed in step S 232 that TVV 20 is jammed open and the diagnosis is terminated in step S 233. However, if the operating variable changes slowly, it is assumed in step S 235 that TVV 20 is closed.

For diagnosing TVV 20 and intake line 18, TVV 20 is opened (step S 245), the operating variable of pump 30 being continuously registered during this step. The operating variable is compared (step S 250) to the comparison value stored in step S 215. If this comparison shows that the operating variable of pump 30 is smaller than the comparison value stored in step S 215 minus a predefinable variable, it is assumed in step S 255 that both TVV 20 and intake line 18 are intact. A drop of the operating variable below the comparison value, i.e., a drop below the ambient pressure level occurring in a tank system which has a fluidic connection to the surroundings, in fact allows the conclusion that TVV 20 is open and that a connection is established between TVV 20 and intake manifold 16 of internal combustion engine 5, i.e., intake line 18 is functioning. In this state, internal combustion engine 5 generates underpressure in intake manifold 16 and thus also in the connector of intake line 18 between intake manifold 16 and TVV 20, the underpressure resulting in a corresponding change in the operating variable of pump 30.

However, if this is not the case, it is checked in step S 260 whether the operating variable of pump 30 is greater than the comparison value plus a second predefinable variable. If this condition is met, it is assumed in step S 265 that TVV 20 is jammed closed. In this case, the pressure in the tank system no longer drops after an activation of the tank venting valve in an opening manner. The diagnostic method is then aborted in a step S 267.

However, if the operating variable of pressure source 30 is not greater than the comparison value plus the second predefinable threshold (variable), it is checked in a step S 270 whether the operating variable of pressure source 30 essentially corresponds to the threshold value (comparison value) stored in step S 215. If this is the case, it is assumed in step S 275 that TVV 20 is functioning properly, while intake line 18 and in particular the connection of TVV 20 to intake manifold 16 of internal combustion engine 5 is not functioning properly. The method is then aborted in step S 277.

The method according to the present invention for testing the functionality of a tank system of a motor vehicle having an internal combustion engine has been described above based on an exemplary embodiment in which testing of the tightness of the tank venting system takes place by inserting overpressure. It should be understood that the present invention is not restricted to testing using overpressure. Moreover, testing may also take place by inserting underpressure into the tank system. The underpressure, which is introduced in the tank system in this case, is selected to be lower than the underpressure which, at the opening of the tank venting valve, is caused by the intake manifold underpressure in the tank system and the venting system. Underpressures of approximately one tenth of the intake manifold underpressure have proven to be usable values.

What is claimed is:

1. A method for testing a functionality of a tank venting system of a motor vehicle having an internal combustion engine, including a controllable tank venting valve connected to an intake manifold, and including at least one pressure source for testing a tightness of the tank venting system using one of an overpressure and underpressure, the method comprising:

testing a functionality of the tank venting valve via its activation in at least one of an opening and a closing manner during pressurization of the tank system using one of an overpressure and underpressure and by registering and evaluating at least one operating variable of the pressure source, wherein the tank system is pressurized using one of an overpressure and underpressure and the at least one operating variable of the pressure source is registered and evaluated during operation of the internal combustion engine;

registering the operating variable of the pressure source while the tank system has a fluidic connection to the surroundings, and storing the registered operating variable as a comparison value;

introducing one of an overpressure and underpressure into the tank system;

opening the tank venting valve and registering the operating variable of the pressure source during an opening of the tank venting valve; and comparing the registered operating variable to the comparison value and drawing conclusions about the functionality of the tank venting valve and a functionality of a connection of the tank venting valve to the intake manifold based on the comparison.

2. The method according to claim 1, wherein a functional tank venting valve and a functional connection of the tank venting valve to the intake manifold are assumed when the registered operating variable is smaller than the comparison value by a predefined value.

3. The method according to claim 1, wherein a functional tank venting valve and a non-functional connection of the tank venting valve to the intake manifold are assumed when the registered operating variable substantially corresponds to the comparison value.

4. The method according to claim 1, wherein a jammed closed tank venting valve is assumed when the operating variable does not change after the opening of the tank venting valve.

5. A method for testing a functionality of a tank venting system of a motor vehicle having an internal combustion engine, including a controllable tank venting valve connected to an intake manifold, and including at least one pressure source for testing a tightness of the tank venting system using one of an overpressure and underpressure, the method comprising:

testing a functionality of the tank venting valve via its activation in at least one of an opening and a closing manner during pressurization of the tank system using one of an overpressure and underpressure and by registering and evaluating at least one operating variable of the pressure source, wherein the tank system is pressurized using one of an overpressure and underpressure and the at least one operating variable of the pressure source is registered and evaluated during operation of the internal combustion engine, and wherein ajanimed open tank venting valve is assumed when the operating variable of the pressure source does not change after the tank venting valve has been activated in a closing manner.

* * * * *